United States Patent
Groenninger et al.

(10) Patent No.: US 9,505,326 B2
(45) Date of Patent: Nov. 29, 2016

(54) SUPPORT-ROD BRACKET, HEADREST, AND MOUNTING METHOD

(71) Applicants: Reinhold Groenninger, Maxhuette-Haidhof (DE); Bernhard Klar, Hahnbach (DE); Willibald Ries, Freudenberg (DE)

(72) Inventors: Reinhold Groenninger, Maxhuette-Haidhof (DE); Bernhard Klar, Hahnbach (DE); Willibald Ries, Freudenberg (DE)

(73) Assignee: GRAMMER AG, Amberg (DE)

( * ) Notice: Subject to any disclaimer, the term of this patent is extended or adjusted under 35 U.S.C. 154(b) by 26 days.

(21) Appl. No.: 14/459,895

(22) Filed: Aug. 14, 2014

(65) Prior Publication Data
US 2015/0054327 A1 Feb. 26, 2015

(30) Foreign Application Priority Data
Aug. 22, 2013 (DE) .......................... 10 2013 013 815

(51) Int. Cl.
*A47C 1/10* (2006.01)
*B60N 2/48* (2006.01)

(52) U.S. Cl.
CPC ..... *B60N 2/4829* (2013.01); *B60N 2002/4888* (2013.01); *B60N 2002/4894* (2013.01); *Y10T 29/49947* (2015.01)

(58) Field of Classification Search
CPC .................... B60N 2/4829; B60N 2002/4888; Y10T 29/4992; Y10T 29/49934
USPC ................................................. 297/410, 391
See application file for complete search history.

(56) References Cited

U.S. PATENT DOCUMENTS

| | | | | | |
|---|---|---|---|---|---|
| 6,062,644 | A | * | 5/2000 | Lance | B60N 2/4808 297/410 |
| 6,471,296 | B2 | * | 10/2002 | Lance | A47C 7/38 297/410 |
| 6,719,373 | B2 | * | 4/2004 | Zimmermann | A47C 7/38 297/391 |
| 6,899,395 | B2 | * | 5/2005 | Yetukuri | B60N 2/4817 297/408 |
| 8,459,745 | B2 | * | 6/2013 | Wahlers | B60N 2/4805 297/410 |
| 8,573,702 | B2 | * | 11/2013 | Tscherbner | B60N 2/4811 297/410 |
| 8,807,653 | B2 | * | 8/2014 | Yetukuri | B60N 2/4844 297/408 |
| 9,061,614 | B2 | * | 6/2015 | Sobieski | B60N 2/4829 |
| 2013/0134761 | A1 | * | 5/2013 | Willard | B60N 2/4855 297/408 |

FOREIGN PATENT DOCUMENTS

| | | | |
|---|---|---|---|
| DE | 2836579 A | 5/1980 | |
| DE | 8115017 U | 5/1981 | |
| DE | 29722513 U | 5/1998 | |
| DE | EP 1123831 A1 * | 8/2001 | ........... B60N 2/0232 |
| DE | 10038813 A | 2/2002 | |
| DE | 202005013569 U | 1/2006 | |
| DE | 102007050069 A | 12/2008 | |

* cited by examiner

*Primary Examiner* — Laurie K Cranmer
(74) *Attorney, Agent, or Firm* — Andrew Wilford (57) ABSTRACT

The invention relates to, among others, a headrest-assembly method for securing at least two support rods (12a, 12b) in a headrest to the backrest on a vehicle seat, where each support rod (12a, 12b) is held a guide formation (16a, 16b) of the head box (11).
The special feature is that cross bar (13) is engaged in the head box (11) such that it passes through at least one slot (19a, 19b, 19c) of the head box (11), and the cross rod (13) is fastened at its ends (31, 32) ends (27) of the support rods (12a, 12b).

11 Claims, 9 Drawing Sheets

SUPPORT-ROD BRACKET, HEADREST, AND MOUNTING METHOD

The invention relates first to a support bracket for a headrest for a vehicle seat. The support bracket is formed by a first support rod, a second support rod, and a cross rod.

Such a support bracket is known from prior public use.

An object of the invention is to create a support bracket such that it allows for easy assembly. Especially the assembly of the support bracket should also facilitate easy assembly of the headrest.

The object is attained by a support bracket using the features in claim 1.

The cross rod is attached to the first support rod by a first fastener and to the second support rod by a second fastener. The fastener can be for example any interlocking, force-locked or frictional connection, such as for example a riveted or welded connection.

At least one of the fasteners, the first fastener and/or the second fastener is a wobble fastener. Wobble fastener means, as defined by the invention, that the fastener is produced via wobble deformation of the support rod and/or of the cross rod.

Wobble fasteners, which are also referred to as wobble rivets, or radial rivets, are made by a cold-shaping process. In this method the deforming force acts at any instant only on a very limited surface area of the workpiece. With a tumbling motion of the tool it is possible to deform other surfaces of the workpiece.

Because of the wobble deformation of an end of the cross rod the deformed substance flows radially from a center of the tumbling movement radially toward the outside, thereby forming a rivet or closing head. In this way relative movement of the cross rod relative to the support rod is prevented in a first direction. The fastener may comprise other means that also prevent movement of the cross rod relative to the support rod in another direction. They can for example be interfitting shapes. According to an alternative or in addition at least one guide formation can be provided for the support rod in the head box that, together with the rivet or the rivet head, prevents movement of the support rod relative to the cross rod in a second direction.

For example the support rods each have a hole that is traversed by the respective end of the cross rod. The wobble forming for example takes place on the free ends that project from the holes of the support rods. Thus, the tool deforms for example the end of the cross rod.

For example a first end of the cross rod is firmly fixed to the first cross rod and a second end of the cross rod to the second support rod.

The invention according to a second aspect of the invention relates to a headrest that can be attached to a vehicle seat. The headrest has a head box with a head contact surface. The head box is mounted on a support bracket that can be fastened to the vehicle seat. The head box is movable relative to the support bracket between an upper and a lower position. The support bracket is formed by two support rods attached to each other with a cross rod.

Such a headrest is known from prior public use.

The object of the invention is to create a headrest that is easy to install.

The object is attained by a headrest with the features of claim 1.

According to the invention the headbox is movable relative to the support bracket between a lower position and an upper position. The head box has at least one slot through which passes the cross rod of the support bracket.

The cross rod is attached to the support rods using a fastener, made for example by wobble shaping, welding or the like. During movement between the upper and lower positions, the cross rod moves relative to the slot of the head box. The head box is guided using edges of the slot and an external surface of the cross rod of the support bracket.

The support bracket is embodied according to an embodiment according to the first aspect of the invention.

The headrest has according to an embodiment of the invention a latch that can secure the head box relative to the support bracket in at least two positions.

The headrest can for example comprise an actuator. The actuator has for example a first actuating part attached to the head box and a second actuating part attached to the support bracket. For example the actuator has an actuating element that is movable relative to a mount attached to one of the support brackets. For example the actuating device and the mount have meshing teeth or threads.

The actuating element is for example a drive spindle that meshes with a thread from of the mount. The drive spindle has an external thread connected to an internal thread of a spindle nut of the mount.

For example, the actuator can be moved manually or by a drive motor.

Moreover, the invention relates to a method of assembling a support bracket of a headrest for vehicle seats from a first support bracket, a second support bracket, and a cross rod.

It is an object of the invention to create a support bracket that is easy to install and that allows for easy and flexible installation of the headrest.

The object is attained by a support bracket with the features of claim 10.

The cross rod is attached by a first fastener to the first support rod and by a second fastener to the second support rod.

At least one of the fasteners, the first fastener and/or the second fastener according to an illustrated embodiment is a wobble fastener.

Wobble fastener means as defined by the invention that the fastener is produced by wobble deformation of the support rod and/or pf the cross rod.

With this method a deformation force is effective only on a limited surface area of the workpiece, which is achieved by a wobbling movement of the workpiece.

Because of the wobble deformation of an end of the cross rod and/or the support rod, it is enlarged and subsequently the cross rod is attached to the first support rod or the second support rod.

For example the support rod has at least one hole, through which passes the end of the cross rod. Alternatively for example the cross rod can also have a hole through which passes the support rod. The wobble deformation then for example takes place, on the projecting outer end of the support rod or of the cross rod where it projects from the hole. Thus, the tool for example deforms the end of the cross rod or of the support rod.

For example a first end is in this way firmly attached to the cross rod with the first support rod and a second end to the cross rod with the second support rod.

In addition the invention relates to a method of assembly of a headrest.

The object of the invention is to create a method for assembly of a headrest provided using a support bracket, whereby the assembly method of the support bracket should allow for the formation of various embodiments of the headrest and in this way a headrest with high stability can be produced economically.

The object is attained by a method using the features of claim 12.

In the method according to the invention two support rods are provided that are fastened to the seat back of a vehicle seat. Each support rod is used with an end in a guide formation of the head box. Subsequently a cross rod is used such that it passes through at least one guide slot of the head box. Subsequently the cross rod is fastened to an end of each support rod.

The cross rod can for example be fastened to the support rods by a wobble riveted joint. However, alternatively other joining methods, such as for example welding, are considered.

According to one embodiment of the invention, during the process step of the assembly of the cross rod to the head box, the cross rod passes through a mount fastened to the support rod element. The mount is part of an actuator of the headrest. The mount for this purpose may comprise a sleeve through whose interior the cross rod can extend.

Further advantages of the invention will become obvious from the following description of two of the embodiments presented in the schematic figures. Therein.

A headrest as a whole is described in the figures with reference numeral 10. The same reference numerals in the different figures designate the corresponding parts, even if small letters are added or omitted.

Figure 1A:
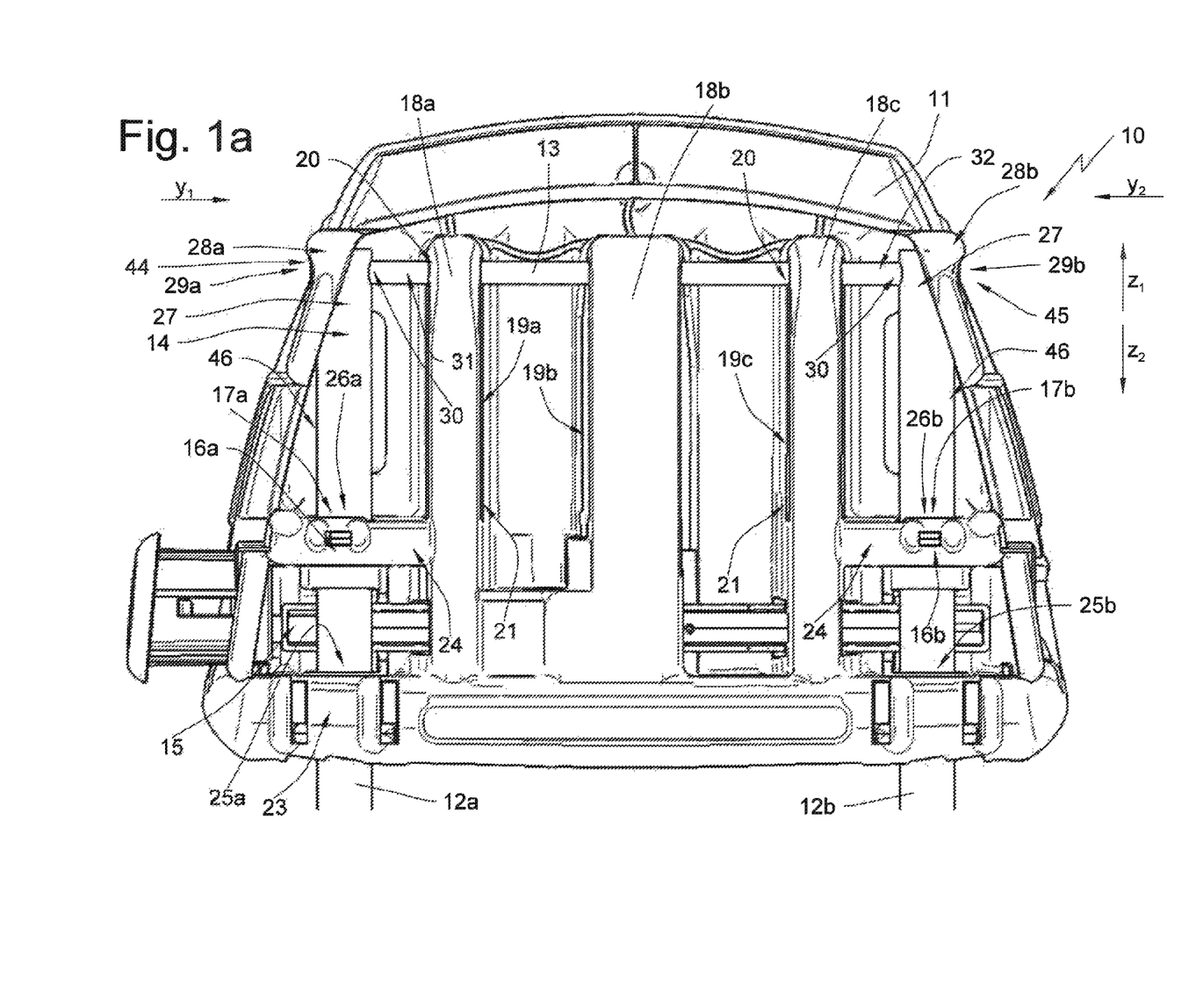
FIG. 1a is a rear view of the headrest in a lower position of the head box, a rear panel not being shown for reasons of clarity, FIG. 1b like FIG. 1a is a rear view of the headrest in an upper position of the head box.

FIG. 1a shows a rear view of the headrest 10 according to the invention. A rear panel is not shown in FIG. 1a.

The headrest has a head box 11 mounted on support rods 12a and 12b that are attached by a cross rod 13 to form a support bracket 14. The head box 11 is formed with guide formations 16a and 16b so that the head box 11 can slide on the support rods 12a and 12b. The guide formations 16a and 16b form a guide 17 in which the support rod 12a or 12b can shift. The head box 11 is thus is movable relative to the support bracket 14 in the $z_1$ and $z_2$ directions.

In FIG. 1a the head box 11 is shown in the lower position.

Figure 1B:
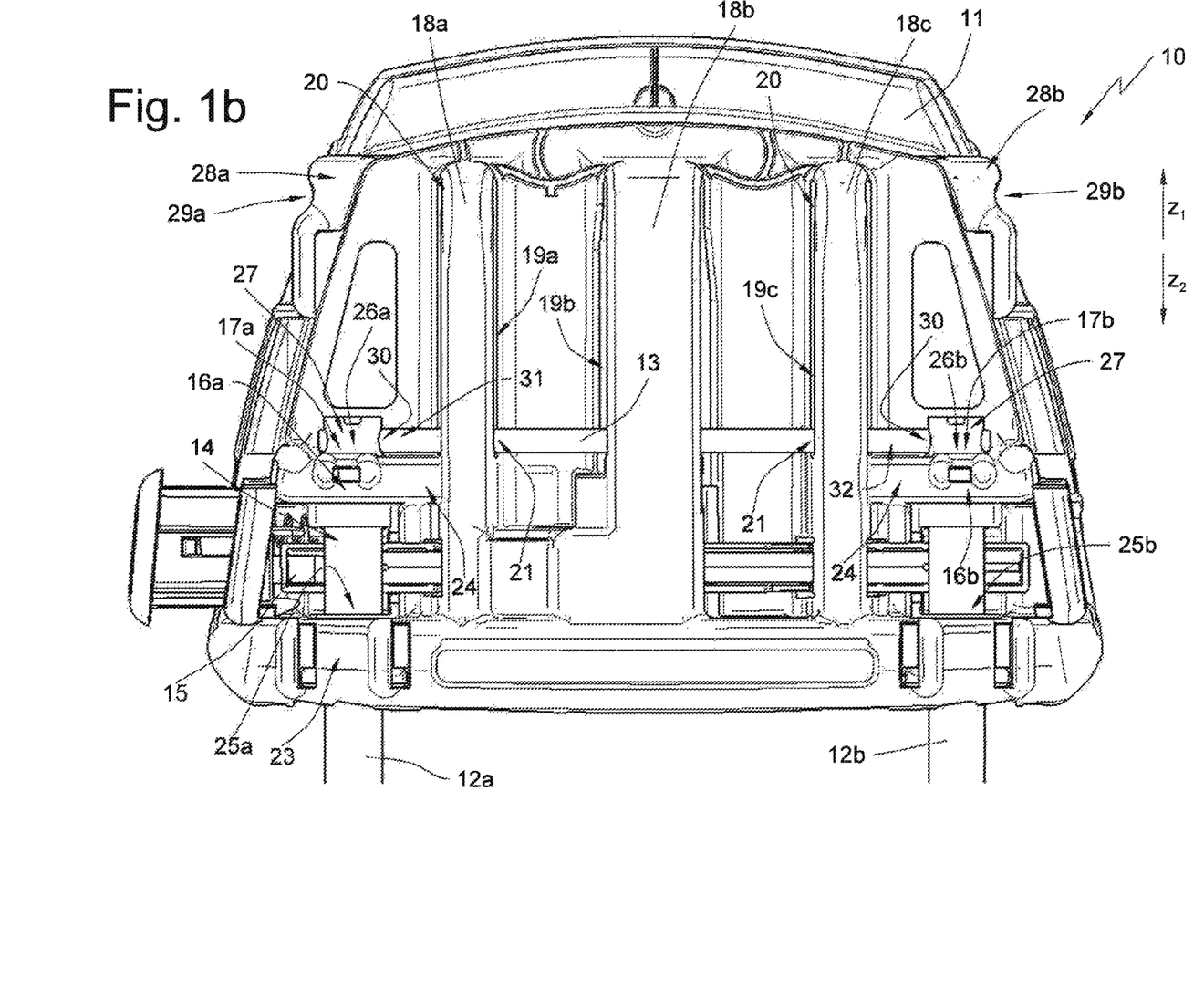

The head box 11 can be moved from the lower position to the upper position shown in FIG. 1b. A latch 15 can secure the head box in the lower, upper, and intermediate positions.

The head box 11 is formed with ribs 18a, 18b, 18c. The rib 18a is formed a slot 19a, the rib 18b with a slot 19b, and the rib 18c with a slot 19c. The slots 19a, 19b and 19c are traversed by the cross rod 13. During movement of the head box 11 the cross rod 13 moves between the lower and the upper position from upper ends 20 of the slots 19a, 19b, 19c to lower ends 21 thereof. In the lower position of the head box 11 according to FIG. 1a the cross rod 13 is at the upper ends 20. In the upper position of the head box 11 according to FIG. 1b the cross rod 13 is at the lower ends 21. The head box 11 is guided on the cross rod 13 by engagement of the cross rod 13 through the slots 19. For this, edges 22 of the slots 19a, 19b and 19c engage an outer surface of the cross rod 13.

Figure 2:
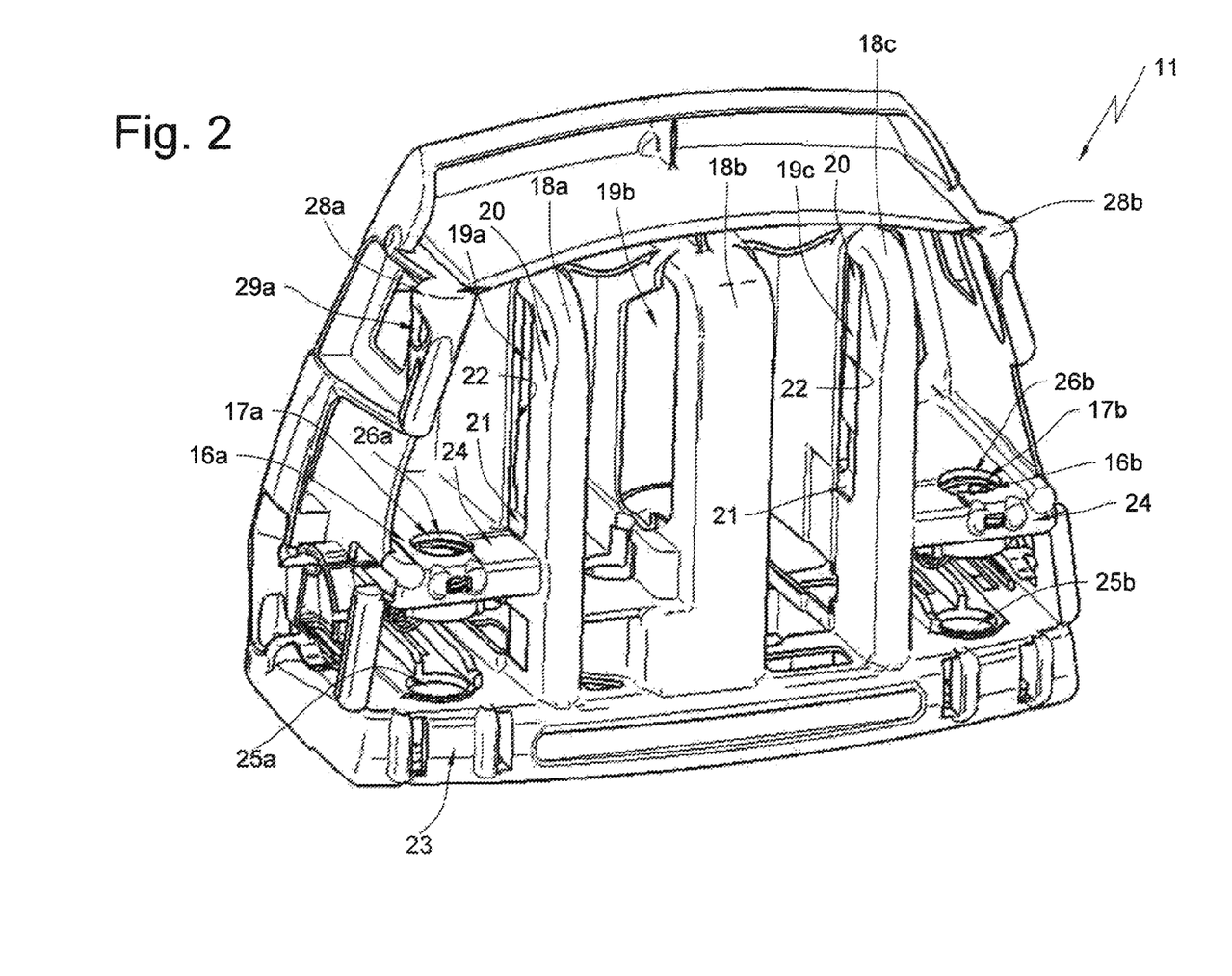
FIG. 2 is a perspective view of the head box of the headrest.

FIG. 2 shows the head box 11 as a one-piece component. FIG. 2 shows that the head box 11 has a lower crossbar 23 and an upper crossbar 24. The lower crossbar 23 is formed with guide holes 25a and 25b and the upper crossbar 24 with guide holes 26a and 26b.

The guide holes 25a and 26a are part of the guide formation 16a and of the guide 17a. The guide holes 25b and 26b are part of the guide formation 16b and of the guide 17b. Ends 27 of the support rods 12a and 12b are fit in the guide and mount seats 28a or 28b when the head box 11 is in the lower position.

The seat 28a is provided with an opening 29a and the seat 28b with an opening 29b. During assembly, the cross rod can be threaded through the openings 29a and 29b.

Assembly of the support rods 12a and 12b and the cross rod 13 with the head box 11 is described below with reference to FIGS. 2 and 3.

Figure 3:
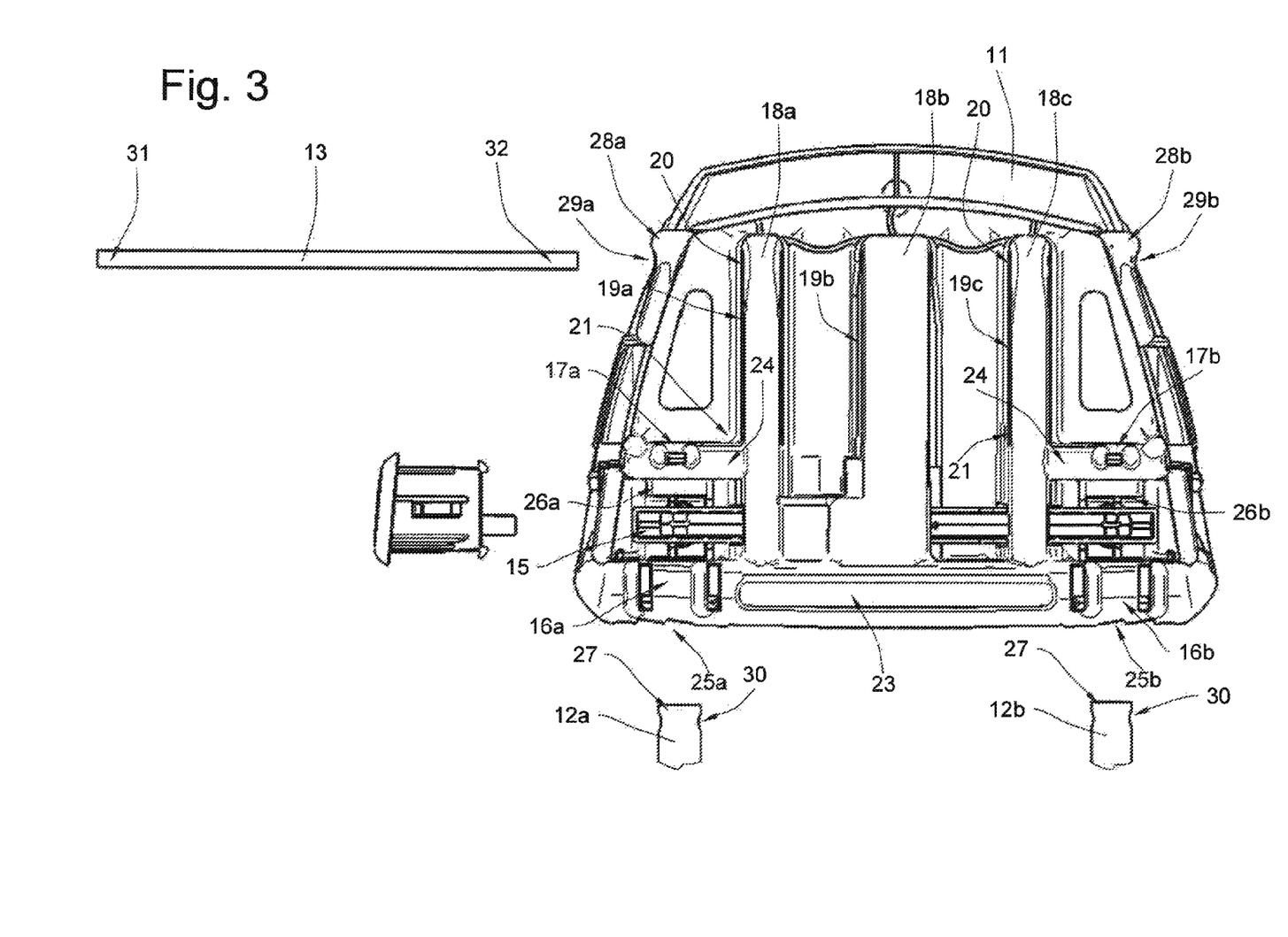
FIG. 3 is an enlarged view of the head box, the support rods and the cross rod.

According to FIG. 3, the support rod 12a is inserted for assembly through the guide hole 25a in the guide 17a and the support rod 12b through the guide hole 25b in the guide 17b, until the end 27 of each support rod 12a and 12b fits in the respective seat 28a or 28b. Subsequently the cross rod 13 for example is threaded through the mounting hole 29a and attached to the ends 27 of the support rods 12a and 12b. Fastening can be achieved in different ways using the known joining methods.

In the illustrated embodiment the ends 27 have holes 30 that for example are throughgoing. The cross rod 13 is positioned in such a way in the holes 30, that it is housed with a first end 31 in the hole 30 of the support rod 12a and with a second end 32 in the hole 30 of the support rod 12b, with the ends 31 and 32 projecting from the respective holes. Subsequently the first end 31 is attached to the support rod 12a and the second end 32 to the support rod 12b by a wobble forming method, also called wobble riveting.

Figure 9:
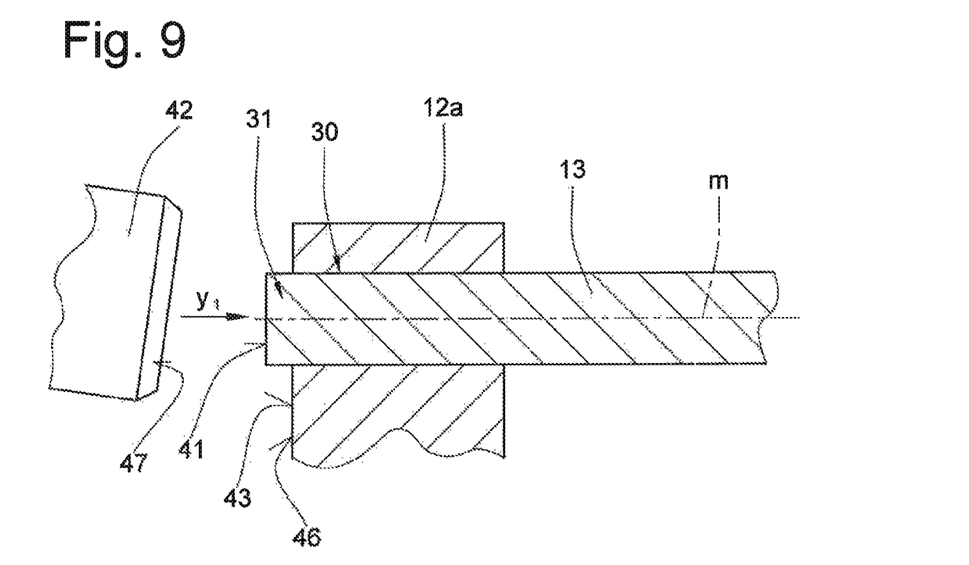
FIG. 9 is a schematic sectional view of an end of the support rod and the cross rod and a tool in front of the wobble riveter, the head box not being shown, FIG. 10 like FIG. 9 shows the end of the support rod and the cross rod after the wobble deformation.
Figure 10:
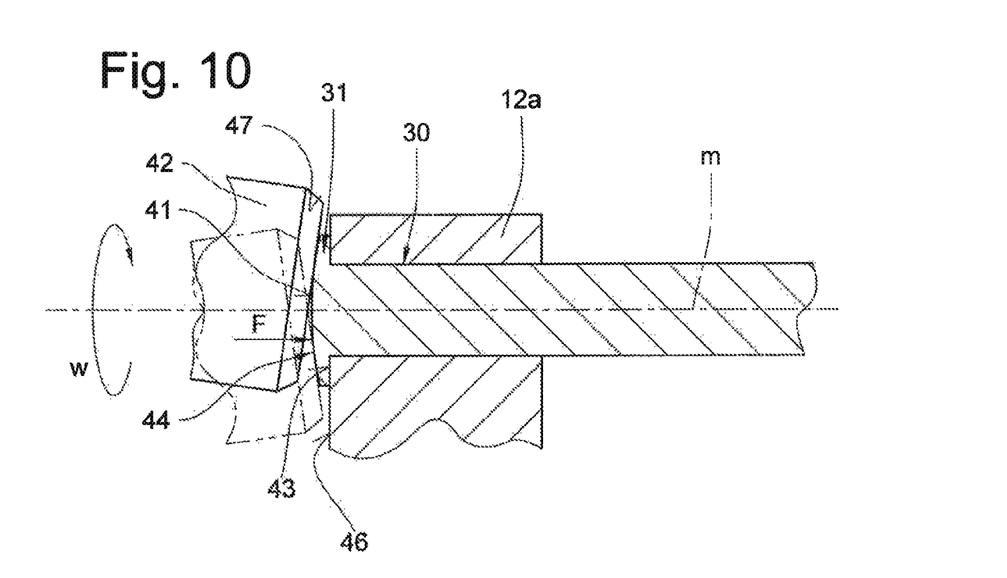

This method is illustrated in FIGS. 9 and 10 in greater detail. FIG. 9 shows the end 31 and the hole 30 in the support rod 12a. The end 31 projects past an outer surface 46 of the support rod 12a from the hole 30. An end face 41 of the end 31 is subjected by a wobbling tool 42 with a deforming force F in direction y. The wobbling tool 42 rotates around a central axis m of the cross rod 13 in a direction w and a contact face 47 of the wobbling tool 42 positioned at an angle to the central axis m so as to eccentrically engage the cross rod.

In this way material from the end 31 is deformed such that it flows radially outward from the center axis m of the cross rod 13 and presses against a region of the hole 30 adjacent an outer surface 43 of the support rod 12a like a rivet or fastener head (see FIG. 10) thereby forming a fastener 44. The end 32 is deformed with the same method to create a fastener 45. The fastener 44 on the outer surface 46 of the support rod 12a prevents movement of the cross rod 13 in the $y_1$ direction; the fastener 45 on the outer surface 46 of the support rod 12b prevents movement of the cross bar 13 in the $y_2$ direction. In this way the cross rod 13 is prevented from moving relative to support rods 12a and 12b.

A second embodiment is shown in FIGS. 4a to 8. The headrest differs from the first embodiment in that an actuator 33 is provided for moving the head box 11 relative to the support bracket 14 in $z_1$, $z_2$ directions. The actuator 33 has a spindle 34 having an external thread 36 and rotatable by a motor 37 in $u_1$ and $u_2$ directions. In addition, a mount 40 of the actuator has a spindle nut 35 with an internal thread 38. The external thread 36 of the spindle [34] meshes with the internal thread 38 of the spindle nut 35. The mount 40 further has a sleeve 39 through which the cross beam 13 passes. The spindle nut 35 and the sleeve 39 are formed in the illustrated embodiment as one piece. They could also be integrally fastened together according to an alternative embodiment.

Assembly of the headrest 10 differs from the first illustrated embodiment in that after the cross rod 13 is passed through the long hole 19a of the rib 18a, the cross rod 13 is threaded through the sleeve 39 of the spindle nut 35. Subsequently the cross rod 13, as with the first illustrated embodiment, is passed through the slot 19b of the rib 18b and through the slot 19c of the rib 18c and fastened to the ends 27 of the support rods 12a and 12b.

Figure 4A:
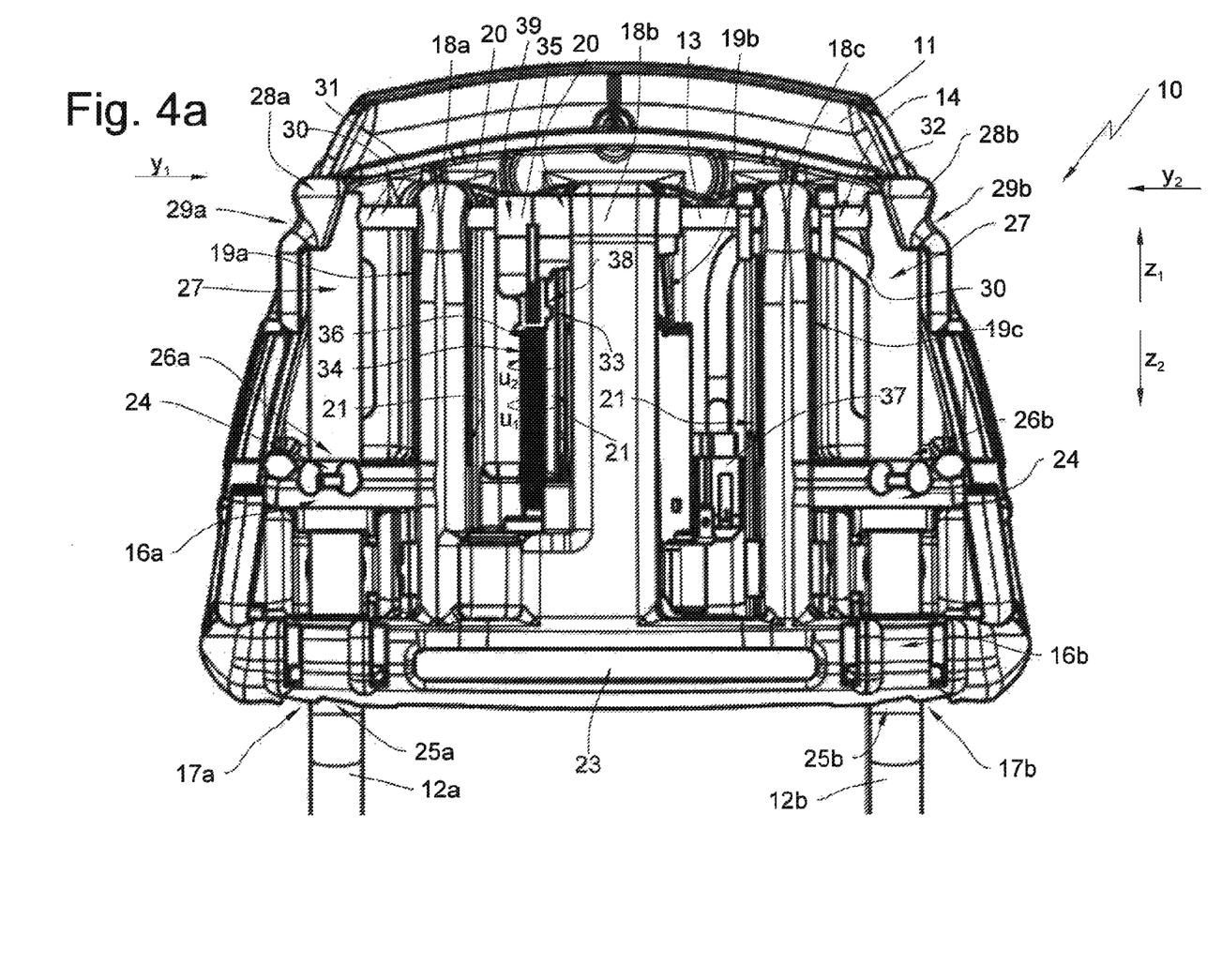
FIG. 4a is a view like FIG. 1 of a second embodiment of the headrest in a lower position thereof.
Figure 4B:
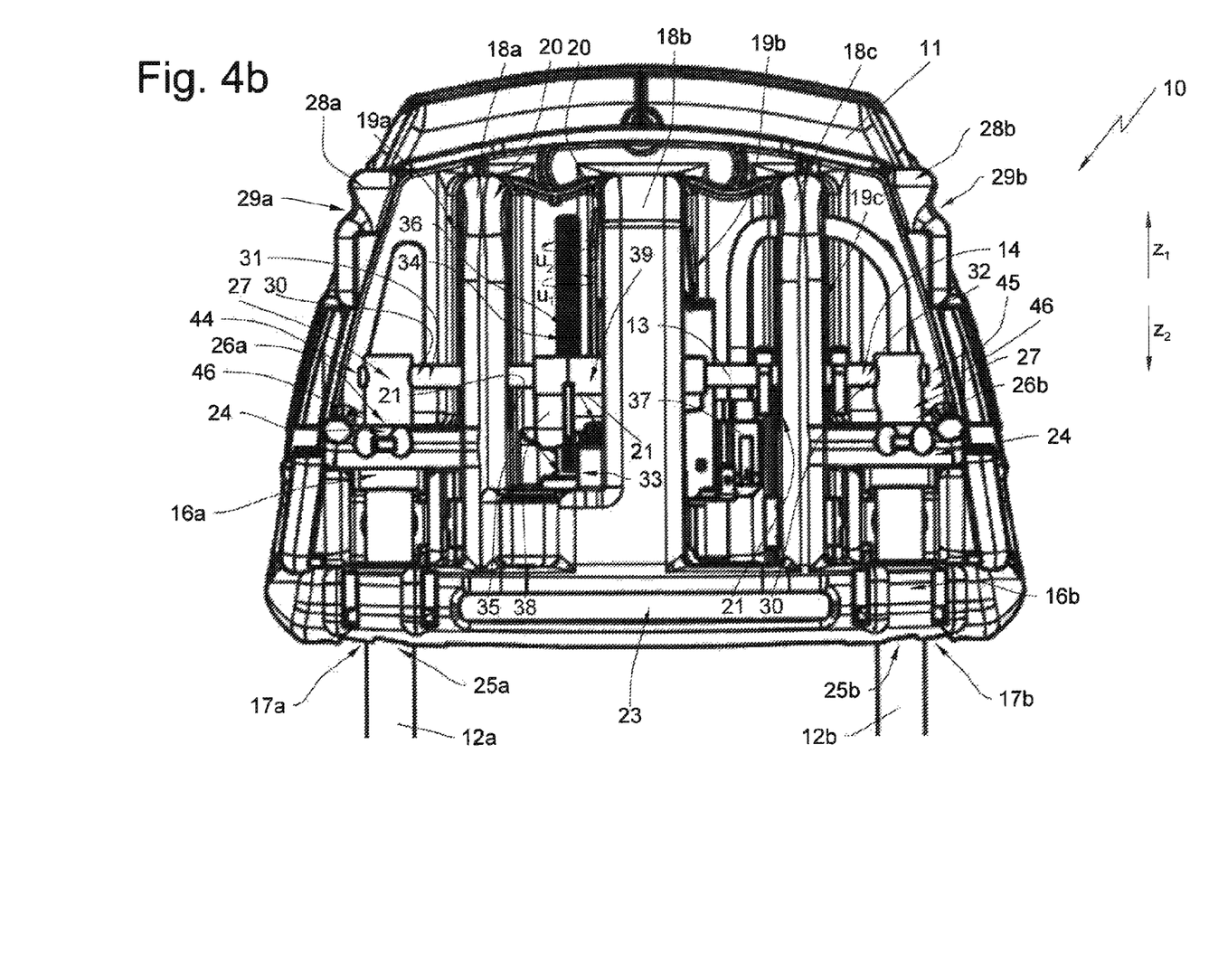
FIG. 4b is a view like FIG. 4a of the headrest in an upper position of the head box.
Figure 5:
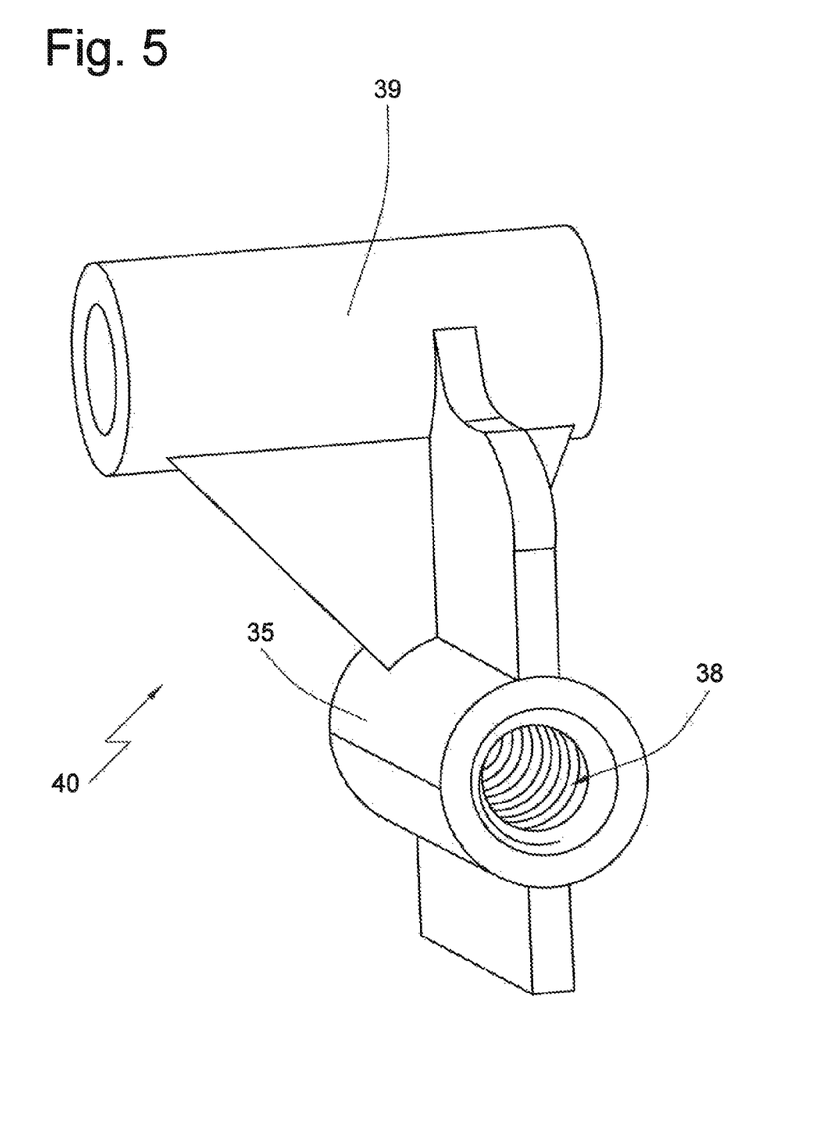
FIG. 5 is a perspective view of a spindle nut of the actuator of the headrest.
Figure 6:
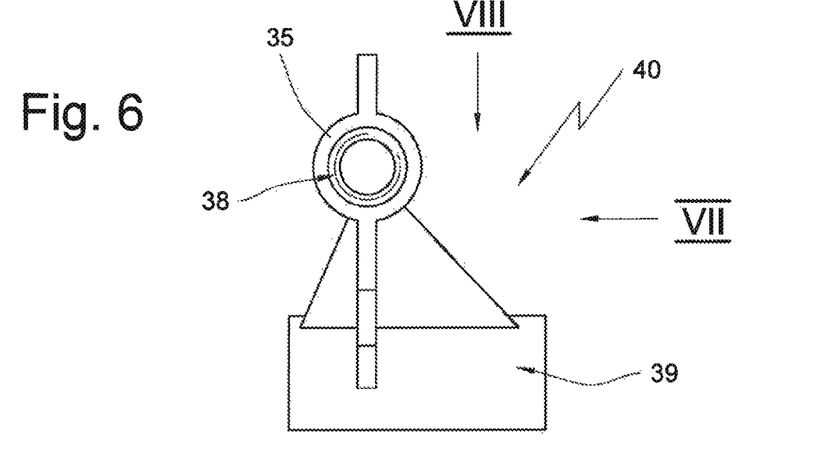
FIG. 6 is a view of the spindle nut, FIG. 7 a view according to arrow VII in FIG. 6, FIG. 8 a view according to arrow VIII in FIG. 6.
Figure 7:
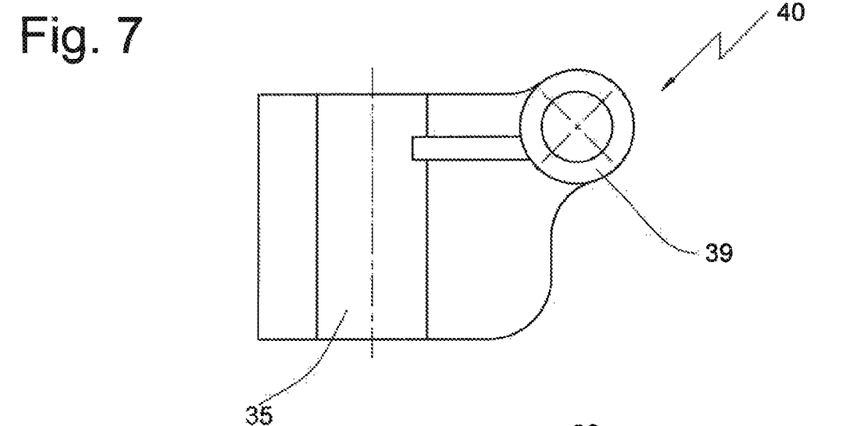
Figure 8:
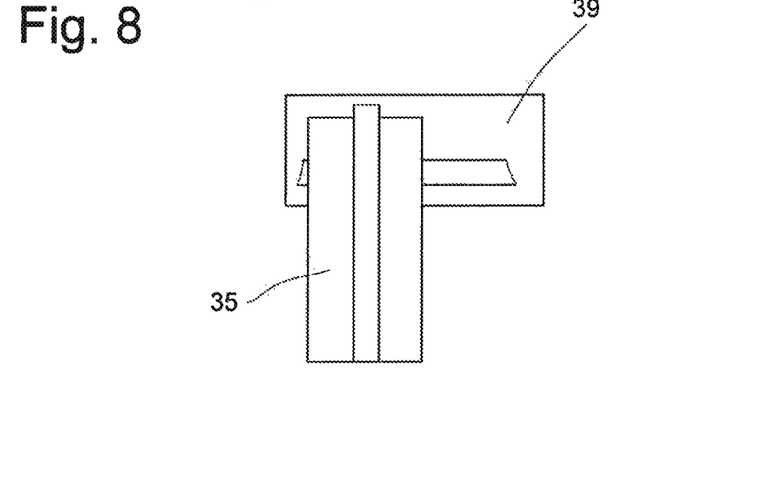

The function of the headrest 10 is described below. If the head box 11 is moved from the lower position shown in FIG. [4a] to the upper position [of FIG. 4b], then the actuator 33 is operated using the actuator such that the motor 37 turns the spindle 34 in the $u_1$ direction. The spindle 34 screws into the spindle nut 35 and in this way moves relative to the spindle nut 35 in the $z_1$ direction. Because the motor 37 and the spindle nut 35 are fastened to the head box 11, the head box 11 also moves relative to the support arm bracket 14 in the $z_1$ direction. To move the head box 11 in the $z_2$ direction, the motor 37 would operate in such a way that it turns the spindle nut 35 in the $u_2$ direction. In this way the spindle 34 unscrews from the spindle nut 35 in the $z_2$ direction, thereby moving the head box also in the $z_2$ direction.

The second embodiment does not provide for a latch, because the resistance of the drive motor is so great that the head box 11 remains in the set position if the motor 37 is not operating.

The invention claimed is:

1. A headrest comprising:
a head box;
two support rods carrying the head box on a back of a vehicle seat and each having an upper end; and
a cross rod extending transversely through the support rods between the upper ends of the support rods, securing the support rods to each other, and having respective outer ends fixed to the respective upper ends and forming fasteners, the head box being formed between the support rods with a slot accommodating the cross rod and being movable relative to the support rods between a lower position and an upper position, the cross rod passing through the slot of the head box and being guided by interaction of edges of the slot and the cross rod while moving between the lower and upper position.

2. The headrest according to claim 1, wherein the headrest has an actuator that has a first actuating part attached to the head box and a second actuating part attached to the cross rod.

3. The headrest according to claim 2, wherein the first actuating part has an actuating element moveable relative to the cross rod and surrounded by the second actuating part.

4. The headrest according to claim 3, wherein the first actuating element has a drive motor that can move the first actuating element.

5. The headrest according to claim 2, wherein the actuator has a drive spindle with an external thread meshing with an internal thread of a spindle nut on the cross rod.

6. The support bracket according to claim 5, wherein the upper ends of the support rods are formed with throughgoing holes and the ends of the cross rod each pass through a respective one of the holes in the respective support rod and the fasteners are each a wobble fastener formed on the respective outer end of the support rod.

7. A method of assembling the headrest as defined in claim 1, the method comprising the step of:
fitting the support rods into the head box; and
attaching the upper ends of the support rods to the outer ends of the cross rod.

8. The headrest-assembly method according to claim 7, wherein the cross rod is passed through a mount that is part of an actuator of the headrest.

9. The headrest-assembly method according to claim 7, wherein at least one fastener is a wobble fastener and is formed by wobble-riveting.

10. The headrest-assembly method according to claim 7, wherein at least one of the fasteners is produced by passing an end of the cross rod through a hole of one of the support rods and fastening it to an outer end thereof with a wobble fastener of the cross rod.

11. A headrest comprising:
a head box;
two support rods carrying the head box on a back of a vehicle seat and each having an upper end formed with a throughgoing hole; and
a cross rod extending transversely through the holes between the upper ends of the support rods, securing the support rods to each other, and having outside the support rods respective ends fixed to the respective upper ends and forming wobble fasteners, the head box being formed between the support rods with a slot accommodating the cross rod and being movable relative to the support rods between a lower position and an upper position, the cross rod passing through the slot of the head box and being guided by interaction of edges of the slot and the cross rod while moving between the lower and upper position.

\* \* \* \* \*